US010713821B1

(12) United States Patent
Surya et al.

(10) Patent No.: US 10,713,821 B1
(45) Date of Patent: Jul. 14, 2020

(54) CONTEXT AWARE TEXT-TO-IMAGE SYNTHESIS

(71) Applicant: Amazon Technologies, Inc., Seattle, WA (US)

(72) Inventors: Shiv Surya, Bangalore (IN); Arijit Biswas, Bangalore (IN); Sumit Negi, Bangalore (IN); Amrith Rajagopal Setlur, Bengaluru (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/454,829

(22) Filed: Jun. 27, 2019

(51) Int. Cl.

| | |
|---|---|
| ***G06N 3/08*** | (2006.01) |
| ***G06T 11/00*** | (2006.01) |
| ***G06T 11/20*** | (2006.01) |
| ***G06F 40/30*** | (2020.01) |

(52) U.S. Cl.
CPC ............ *G06T 11/001* (2013.01); *G06F 40/30* (2020.01); *G06N 3/08* (2013.01); *G06T 11/20* (2013.01)

(58) Field of Classification Search
CPC . G06N 5/00; G06N 3/088; G06N 3/08; G06F 30/27
See application file for complete search history.

(56) References Cited

U.S. PATENT DOCUMENTS

2019/0042574 A1* 2/2019 Kim .................... G06F 3/04842
2019/0138847 A1* 5/2019 Shor .................... G06K 9/6253
2019/0237184 A1* 8/2019 Sharma ................. G06F 40/289
2019/0266442 A1* 8/2019 Malur Srinivasan ........................ G06K 9/6273
2019/0287301 A1* 9/2019 Colbert .................... G06N 3/08
2019/0318040 A1* 10/2019 Chaudhury .............. G06N 3/08
2019/0370666 A1* 12/2019 Ros Sanchez ............ G06T 5/50

OTHER PUBLICATIONS

Xu, et al. AttnGAN: Fine-Grained Text to Image Generation with Attentional Generative Adversarial Networks. 1316-1324. 10.1109/CVPR.2018.00143. (Year: 2018).*
Goldberg, et al. Toward Text-to-Picture Synthesis. NIPS2009 (Year: 2009).*
Im, et al. Generating images with recurrent adversarial networks. (Year: 2016).*

(Continued)

*Primary Examiner* — Phi Hoang
(74) *Attorney, Agent, or Firm* — K&L Gates LLP

(57) ABSTRACT

Techniques are generally described for context aware text-to-image synthesis. First text data comprising a description of an object may be received. A recurrent neural network may determine a first semantic representation data representing the first text data. A generator trained using a first generative adversarial network (GAN) may determine first image data representing the object using the first semantic representation. An encoder of a second GAN may generate a first feature representation of the first image data. The first feature representation may be combined with a projection of the first semantic representation data. A decoder of the second GAN may generate second image data representing the first text data.

20 Claims, 7 Drawing Sheets

(56) References Cited

OTHER PUBLICATIONS

Conneau, et al.; Supervised Learning of Universal Sentence Representations from Natural Language Inference Data; Proceedings of the 2017 Conference on Empirical Methods in Natural Language Processing; Sep. 7, 2017; pp. 670-680; Copenhagen, Denmark.
Subramanian, et al.; Learning General Purpose Distributed Sentence Representations via Large Scale Multi-task Learning; Published as a conference paper at ICLR 2018; 2018; 16 pgs.
Cer, et al.; Universal Sentence Encoder; Google Research; Apr. 12, 2018; 7 pgs.
Sechidis, et al.; On the Stratification of Multi-Label Data; Joint European Conference on Machine Learning and Knowledge Discovery in Databases; pp. 145-158; 2011.
Mikolov, et al.; Efficient Estimation of Word Representations in Vector Space; International Conference on Learning Representations; 12 pgs; Sep. 7, 2013.
Goodfellow, et al.; Generative Adversarial Nets; Advances in neural information processing systems; pp. 2672-2680; Jun. 10, 2014.
Pennington, et al.; GloVe: Global vectors for word representation; Proceedings of the 2014 Conference on Empirical Methods in Natural Language Processing; pp. 1532-1543; Oct. 25, 2014.
Mirza, et al.; Conditional Generative Adversarial Nets; Cornell University; 7 pgs; Nov. 6, 2014.
He, et al.; Deep Residual Learning for Image Recognition; Proceedings of the IEEE conference on computer vision and pattern recognition; pp. 770-778; Dec. 10, 2015.
Radford, et al.; Unsupervised Representation Learning with Deep Convolutional Generative Adversarial Networks; International Conference on Representation Learning; 16 pgs; Jan. 7, 2016.
Reed, et al.; Generative Adversarial Text to Image Synthesis; 33rd International Conference on Machine Learning; pp. 1060-1069; Jun. 5, 2016.
Salimans, et al.; Improved Techniques for Training GANs; Advances in Neural Information Processing Systems; pp. 2234-2242; Jun. 10, 2016.
Van Den Oord, et al.; Conditional Image Generation with Pixelcnn Decoders; Advances in Neural Information Processing Systems; pp. 4790-4798; Jun. 18, 2016.
Yan, et al.; Attribute2image: Conditional Image Generation from Visual Attributes; European Conference on Computer Vision; pp. 776-791; Oct. 8, 2016.
Mogren; C-RNN-GAN: A Continuous Recurrent Neural Network with Adversarial Training; Constructive Machine Learning Workshop; Conference on Neural Information Processing Systems; 6 pgs; Nov. 29, 2016.
Metz, et al.; Unrolled Generative Adversarial Networks; International Conference on Representation Learning; 25 pgs; 2017.
Arjovsky, et al.; Towards Principled Methods for Training Generative Adversarial Networks; International Conference on Representation Learning; 17 pgs; Jan. 17, 2017.
Odena, et al.; Conditional Image Synthesis with Auxiliary Classifier GANs; Proceedings of the 34th International Conference on Machine Learning; vol. 70 pp. 2642-2651; Jun. 20, 2017.
Zhang, et al.; Stack GAN: Text to Photo-Realistic Image Synthesis with Stacked Generative Adversarial Networks; Proceedings of the IEEE International Conference on Computer Vision; pp. 5907-5915; Aug. 5, 2017.
Zhu, et al.; Be Your Own Prada: Fashion Synthesis with Structural Coherence; Proceedings of the IEEE International Conference on Computer Vision; pp. 1680-1688; Oct. 19, 2017.
Hyland, et al.; Real-Valued (Medical) Time Series Generation with Recurrent Conditional GANs; Cornell University; 13 pgs; Dec. 4, 2017.
Subramanian et al.; Learning General Purpose Distributed Sentence Representations via Large Scale Multitask Learning; Conference paper from ICLR 2018; 16 pgs; 2018.
Yadav, et al.; Stabilizing Adversarial Nets with Prediction Methods; International Conference on Learning Representations; 21 pgs; Feb. 8, 2018.
Miyato, et al.; Spectral Normalization for Generative Adversarial Networks; International Conference on Learning Representations, 26 pgs; Feb. 16, 2018.
Cer et al.; Universal Sentence Encoder; Cornell University; 7 pgs; Apr. 12, 2018.
Shen, et al.; Baseline Needs More Love: On Simple Word-Embedding-Based Models and Associated Pooling Mechanisms; Annual Conference of the Association for Computational Linguistics; 13 pgs; May 24, 2018.
Zhang, et al.; StackGAN++: Realistic Image Synthesis with Stacked Generative Adversarial Networks; IEEE Transactions on Pattern Analysis and Machine Intelligence; 16 pgs; Jun. 28, 2018.

* cited by examiner

CONTEXT AWARE TEXT-TO-IMAGE SYNTHESIS

BACKGROUND

Machine learning is a field of artificial intelligence that allows computer-implemented systems to perform a task without the use of task-specific code. Machine learning systems may be trained to progressively improve performance of a task using sets of training data. In supervised machine learning, annotated data (e.g., data with a labeled input and desired output) can be used to "train" a machine learning model. During training, parameters (e.g., weights and/or biases) of the machine learning model are adjusted so that the output of the machine learning model for a given input matches the desired output from the annotated data. Accuracy and/or predictive value of machine learning models are often a function of the quantity and quality of data used to train the machine learning model.

DETAILED DESCRIPTION

Figure 1:
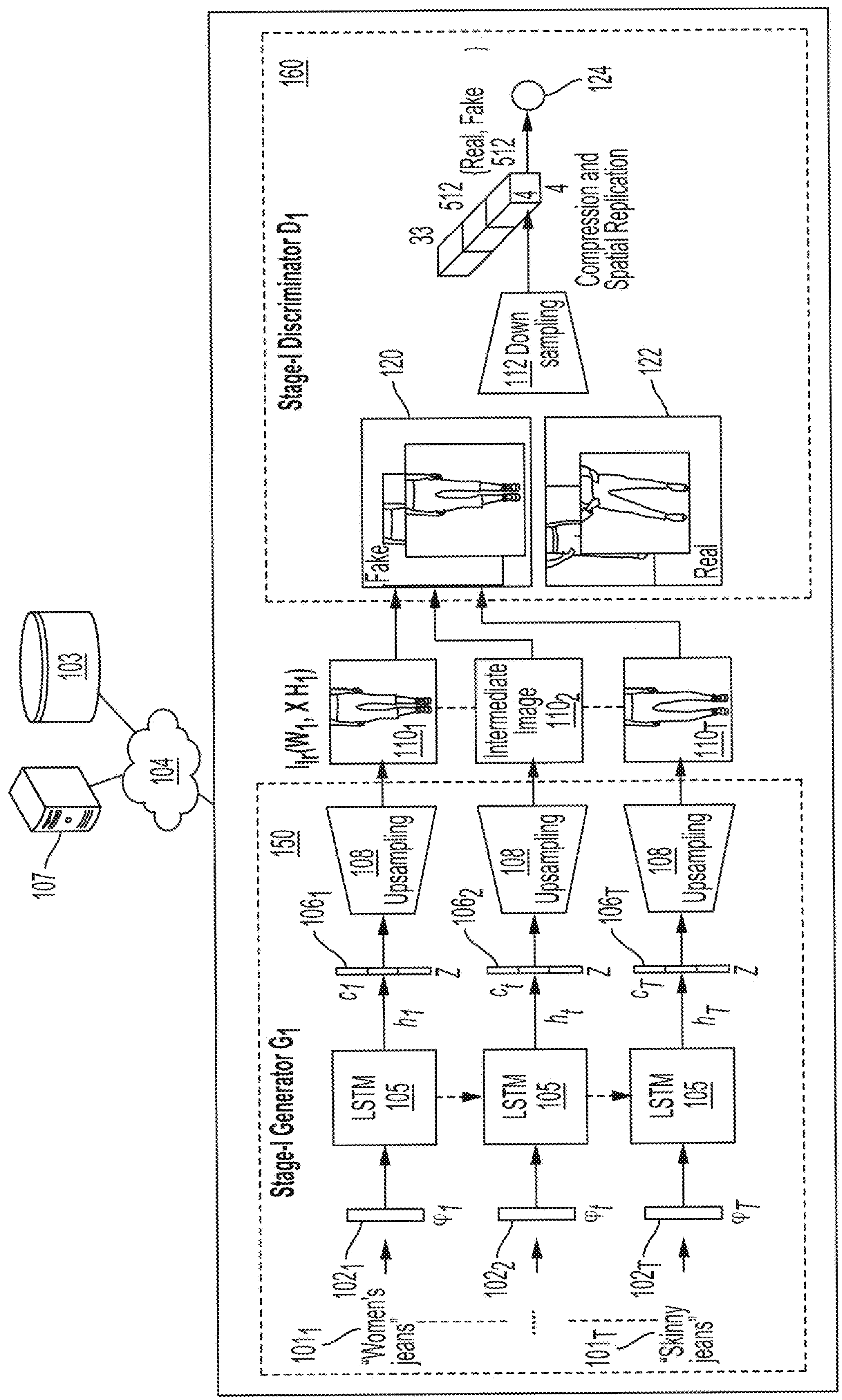
FIG. 1 is a block diagram showing an example system effective to generate synthetic image data from text data, arranged in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

A user of a search engine may search for an item without being aware of all of the different permutations that may be available for the item. For example, a user may search an online retailer for blue pants. However, the use of the search string "blue pants" may return a very large set of items. For example, the search may return pants of different lengths, styles, shades of blue, sizes, men's style pants, women's style pants, children's pants, etc. Accordingly, the user may refine the search to narrow down the results and/or to confine the search results to a particular area of interest. However, the semantic complexity of fashion, color-matching complexity, and the large variety of fashion styles and/or product attributes may make it difficult for a user to select the search terms such that a desired item or set of items are returned. In various examples, a machine learning system is described that generates image data representative of text strings (e.g., search strings). In the fashion search example provided above, the image data may allow the user to visualize clothing garments that are representative of the user's current query, thereby allowing the user to see a visual depiction of items/objects associated with that query. The user may then modify the search query to tailor the results according to the synthetic image data generated in response to the user's initial query. Upon modification of the search query, a new image may be generated using the various techniques described herein. Advantageously, the various machine learning techniques described herein allow for the new image to be conditionally dependent upon previously-generated images in the same search session and/or previously generated search queries (e.g., images generated based on the original search query and/or based on prior search query modifications). Accordingly, the image data generation is context aware.

For example, a user may initially perform a search using the search query "blue pants." Initially, the machine learning models described herein may generate a synthetic image of blue denim jeans. The user may thereafter modify the query to such that the search string is "capri pants." Thereafter, a new image may be generated using the various techniques described herein. Whereas previous systems may have then generated image data showing capri pants, generally (e.g., of any color), the various techniques described herein are context aware and may generate an image of pants that are associated with the capri style while also being blue in color. The user may further modify the search query to state "skinny capri pants." The various techniques may then generate an image of blue capri pants that are more narrowly tapered relative to what was previously shown in the synthetic image data.

Various machine learning models described herein may be used to generate photorealistic synthetic image data representing any desired object(s), depending on the training data sets used to train the various machine learning models. For simplicity, examples are provided in which images of articles of clothing are depicted. However, it should be appreciated that the techniques described herein may be agnostic to any particular type and/or class of objects and may be generally applicable to any object and/or visible features.

In various examples, the text-to-image synthesis machine learning systems described herein may include a stage-I generative adversarial network (GAN) and a stage-II GAN that may be used to iteratively generate images representative of input text as the input text is modified over time during a session (e.g., during a search session). The text-to-image machine learning systems may leverage recurrent neural networks (RNNs) to model sequences of data to generate image data that represents the subject matter described by text descriptions as the text descriptions are input and modified over time.

The stage-I GAN may comprise an RNN that may be used to incrementally encode text attributes describing the subject matter for which image data will be generated in a hidden representation (e.g., an extracted feature). The hidden representation corresponding to each text input (e.g., an original input, followed by one or more text string modifications) is fed into an up -sampling block along with a representation of color corresponding to color information (if any) in the input text string and a noise vector used to introduce variability into the output image data. The generator of the stage-I GAN may generate a low-resolution image with the basic contour and color of the object described in the current text string. Conditioned on the low-resolution image generated by the stage-I generator, the stage-II generator up-samples the generated image and adds finer details including texture, stylistic details, and/or color gradients producing a more realistic high-resolution image that may be output to a user.

FIG. 1 is a block diagram showing an example system effective to generate synthetic image data from text data, arranged in accordance with various aspects of the present disclosure. In various examples, computing device(s) 107 may be effective to implement various components of FIG. 1 such as stage-I generator 150 and stage-I discriminator 160, as well as components thereof. In various examples, computing device(s) 107 may be configured in communication such as over a network 104. Network 104 may be a wide area network, such as the internet, a local area network, and/or some combination thereof. Additionally, in various examples, computing device(s) 107 may be configured in communication with a non-transitory, computer-readable memory 103. Non-transitory, computer-readable memory 103 may be effective to store one or more instructions that, when executed by at least one processor of computing device(s) 107, program the at least one processor to perform the various techniques described herein. Additionally, memory 103 may store one or more of the machine learning models described herein such as the GANs and RNNs discussed in further detail below.

Generally, in machine learned models including various generators, discriminators, RNNs, encoders, and decoders described herein, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

Stage-I GAN

FIG. 1 depicts a stage-I generator 150 and a stage-I discriminator 160 that collectively form a stage-I GAN network. The GAN may be trained as described below. However, during runtime, text-to-image synthesis may be performed by generator 150, as trained using discriminator 160 (but without use of discriminator 160 to perform the image synthesis). Text strings 101 (including text strings 101$_1$, 101$_2$, ..., 101$_T$) represent an initial text string 101$_1$ used, for example, in a search for a particular clothing item or other object, and modifications of that text string over time (e.g., text strings 101$_2$ . . . 101$_T$). In various examples, text strings 101 may include text data that includes a description of an object of interest. In the example shown in FIG. 1, the initial text string 101$_1$ is "Women's jeans." The initial text string 101$_1$ may be embedded as sentence embedding 102$_1$ $\varphi_1$ that may be fed into an input layer of an RNN. For example, $\varphi_1$ may be fed into a long short term memory (LSTM) neural network 105. Advantageously, the LSTM network 105 may store state information regarding previous text inputs/modifications as a text string is modified during a particular session. Accordingly, the LSTM network 105 may provide output conditioned on the previous search strings.

The LSTM network 105 may output a hidden state $h_1$ (e.g., a hidden state vector and/or hidden state data) semantically describing the input text string 101$_1$. Generally, the hidden state $h_t$ may be a semantic representation (e.g., semantic representation data) of the input text data (including past history of text modifications). The hidden state $h_1$ may be combined with noise vector z and color embedding data $c_t$ to generate the conditioning data $q_i$ 106$_1$. For example, hidden state $h_t$ may be combined with noise vector z and color embedding data $c_t$ by up-sampling component 108. Up-sampling component 108 may aggregate the embeddings $h_t$, $c_t$, and/or z. Color embedding data $c_t$ may represent one or more colors described in the input text data. Noise vector z may be a noise vector independently sampled from a given data distribution (e.g., a normal distribution and/or a mixture of Gaussian distributions). Noise vector z may be determined by sampling the noise distribution of noise values, and may be used to provide variation in the images generated using the text-to-image synthesis models described herein, according to the value of z sampled from the distribution.

The conditioning data $q_1$ 106$_1$, comprising the color embedding data $c_t$, the hidden state data $h_t$, and the noise vector z may sent to an input layer of a decoder (e.g., a decoder model of the stage-I generator 150, trained as part of an encoder/decoder pair). For example, the conditioning data $q_1$ 106$_1$ may be up-sampled using up-sampling component 108 (e.g., a de-convolutional decoder trained using the stage-I GAN) to generate low resolution image data 1101. The low resolution image data 1101 may be referred to as synthetic as it was generated from text data and does not necessarily represent an object in the physical world. During training of the Stage-I GAN, stage-I discriminator 160 receives the low resolution image data from the generator 150 and down-samples the low resolution image data 110 (e.g., image data 110$_1$, 110$_2$, . . . , 110$_T$) using convolutional encoder 112 (e.g., a component used to perform down-sampling of the image data). Discriminator 160 includes one or more neurons in an output layer 124 that generate a label for each image sent to discriminator 160 indicating whether the particular image data is "real" (e.g., image data captured using an image sensor and/or image data that has not been generated by generator 150) or "fake" (e.g., synthetic image data that discriminator 160 has determined to have been generated by generator 150).

Training Stage-I

Stage-I comprises an LSTM network 105 feeding into a convolutional encoder 112 trained end-to-end. $I_r$ may be real (non-synthetic) image data and $\mathcal{Y} = \{\mathcal{Y}_1, \mathcal{Y}_2, \mathcal{Y}_3, \ldots, \mathcal{Y}_T\}$ may be sequence of fine-grained text attributes describing $I_r$ from the true data distribution $p_{data}$. $z = \{z_1, z_2, z_3, \ldots, z_T\}$ may be a sequence of noise vectors independently sampled from a given data distribution $p_z$.

$\varphi_t$ (e.g., $102_1$, $102_2$, . . . , $102_T$) may be the sentence embedding of the given fine-grained attribute $y_t$. $\varphi_t$ may be generated by applying a compositional function over word embeddings in the text string. In one example, SWEM-concat (Dinghan Shen, Guoyin Wang, Wenlin Wang, Martin Renqiang Min, Qinliang Su, Yizhe Zhang, Chunyuan Li, Ricardo Henao, and Lawrence Carin. *Baseline needs more love: On simple word-embedding-based models and associated pooling mechanisms.* In ACL, 2018) may be used to generate $\varphi_t$. However, any embedding technique may be used to generate the embedding $\varphi_t$. For example, supervised methods of determining sentence embeddings (Alexis Conneau, Douwe Kiela, Holger Schwenk, Lic Barrault, Antoine Bordes. *Supervised Learning of Universal Sentence Representations from Natural Language Inference Data.* Proceedings of the 2017 Conference on Empirical Methods in Natural Language Processing. Pgs. 670-680; Sandeep Subramanian, Adam Trischler, Yoshua Bengio, Christopher J Pal. *Learning General Purpose Distributed Sentence Representations via Large Scale Multi-task Learning.* International Conference on Learning Representations. 2018, etc.). The generated sentence embedding $\varphi_t$ is sent as an input to LSTM network 105. For each time step in the forward pass of LSTM network 105, the output hidden state $h_t$ of LSTM network 105 is obtained. The hidden state output $h_t$ may be used as an embedding for text conditioning as it captures the fine-grained attribute at time-step $t$ as well as the past history (e.g., previous text strings/previous modifications). The hidden state $h_t$ may be stacked with the colour embedding $c_t$ (described in further detail below) at each time-step $t$ to obtain the conditioning $q=\{q_1, q_2, q_3, \ldots, q_T\}$ (e.g., $106_1$, $106_2$, . . . , $106_T$). Stage-I GAN, conditioned on q and random noise variable $z$, trains the discriminator $D_1$ and the generator $G_1$ by alternatively maximizing the stage-I discriminator loss $\mathcal{L}_{D_1}$ in Eq. (1) and minimizing the stage-I generator loss $\mathcal{L}_{G_1}$ in Eq. (2).

$$\mathcal{L}_{D_1} = \mathbb{E}(I_r, q) \sim p_{data}\left[\sum_{t \in T} \log D_1(I_r, q_t)\right] + \mathbb{E}_{z \sim p_z, q \sim p_{data}}\left[\sum_{t \in T} \log(1 - D_1)(G_1(z_t, q_t), q_t)\right], \quad (1)$$

$$\mathcal{L}_{G_1} = \mathbb{E}_{z \sim p_z, q \sim p_{data}}\left[\sum_{t \in T} \log(1 - D_1)(G_1(z, q_t), q_t)\right] \quad (2)$$

Although the loss functions above may be appropriate for various embodiments, other loss functions may be used in accordance with the techniques described herein, depending on the particular implementation.

Model Architecture—Stage-I

For the stage-I generator 150 ($G_1$), the hidden state $h_t$ of LSTM network 105 is stacked with random noise vector $z_t$ and colour embedding $c_t$ at each time-step $t$. The resultant $N_g$ dimensional conditioning vector $q_t$ is convolved by a series of up-sampling blocks (e.g., at up-sampling component 108) to get a $W_1 \times H_1$ image $I_{lr}$.

For the stage-I discriminator 160 ($D_1$), the conditioning embedding comprising the LSTM network 105 hidden state $h_t$ and the colour embedding $c_t$ may be stacked to get an embedding of size $N_d$ dimensions and replicated spatially to form an $M_d \times M_d \times N_d$ tensor. The generated image $I_{lr}$, may be encoded by the discriminator encoder (e.g. convolutional encoder 112) and stacked (e.g., concatenated or otherwise combined) along with the spatially-replicated conditioning embedding (e.g., $h_t$ and $c_t$). The resultant tensor may be convolved with 1×1 convolutional layer to project it to a lower dimensional space and sent to a classifier layer with a single neuron (e.g., output layer 124) that may be used to produce the decision score classifying the low resolution image $I_{lr}$, as real (e.g., image 122) or fake (e.g., image 120).

Figure 2:
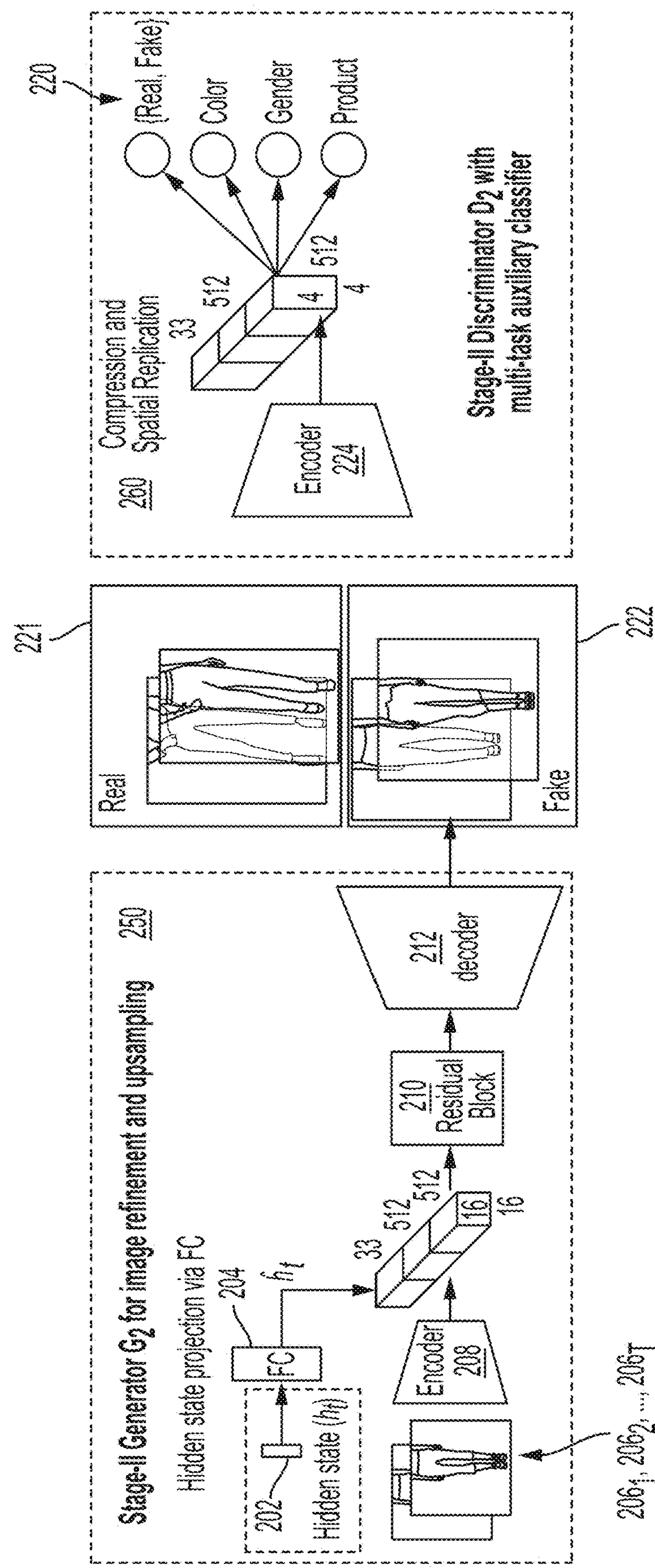
FIG. 2 is another block diagram depicting a system that is usable in conjunction with the system depicted in FIG. 1 to generate high resolution synthetic image data from text data, in accordance with various aspects of the present disclosure.

FIG. 2 is another block diagram depicting a system that is usable in conjunction with the system depicted in FIG. 1 to generate high resolution synthetic image data from text data, in accordance with various aspects of the present disclosure. In particular, FIG. 2 depicts a stage-II GAN that may be used in conjunction with the stage-I GAN described in FIG. 1 to improve the quality of the image data generated by the stage-I GAN. For example, the stage-I GAN may output image data at a resolution of 64×64 pixels, while the stage-II GAN may output image data at a resolution of 256×256 pixels. It should be appreciated that the foregoing resolutions are merely examples and that the resolutions depend on the particular implementation. In addition, the output of the high resolution image data generated by the stage-II GAN may include additional image detail such as texture and/or color gradients, for example.

Stage-II GAN

In various examples, the stage-I generator 150 trained using stage-I discriminator 160 may generate images (e.g., image data) that may lack finer details, such as texture and/or rich color gradients that are typically present in images that are considered photorealistic. Using the various techniques described below, the stage-II generator 250, as trained using the stage-II GAN network depicted in FIG. 2, may be effective to improve the image quality of the low resolution images $I_{lr}$, generated using the stage-I GAN network depicted in FIG. 1.

The stage-II GAN may receive a learned projection of the hidden state 202 ($h_t$) from a fully-connected layer 204 and/or any other deep neural network (DNN) of any number of layers. The learned projection output by the fully-connected layer 204 (or other DNN) may be represented as $\hat{h}_t$. $\hat{h}_t$ may represent a conditioning vector and may be combined with the color embedding $c_t$. Let $\hat{q} = \{q_1, \hat{q}_2, \hat{q}_3, \ldots, \hat{q}_T\}$ be the conditioning corresponding to stacked projected embedding $\hat{h}_t$ and colour embedding $c_t$ for all time steps $t$.

The low-resolution image data generated using the stage-I generator 150 ($I_{lr}$) (e.g., image data $206_1$, $206_2$, . . . , $206_T$) may be sent to an encoder model of stage-II generator 250. For example, the low-resolution image data $I_{lr}$, may be encoded using an encoder 208 to generate a feature representation of the low resolution image data $I_{lr}$. The feature representation of the low resolution image data $I_{lr}$, may be stacked with the conditioning $\hat{q}$ (e.g., through concatenation) and sent to an input layer of residual block 210. Residual block 210 may be effective to generate improved image data (e.g., relative to low resolution image data $I_{lr}$) that may be up-sampled using decoder 212 to generate high resolution image data $I_{hr}$. Residual block 210 may be an optional decoder stage and may be omitted in various implementations.

Training Stage-II

Conditioning on the low-resolution result $I_{lr}=G_1(z, q)$ and $\hat{q}$, the discriminator 260 $D_2$ and generator 250 $G_2$ in the Stage-II GAN may be trained by alternatively maximizing $\mathcal{L}_{D_2}$ in Eq. (3) and minimizing $\mathcal{L}_{G_2}$ in Eq. (5). Stage-II discriminator 260 may comprise a convolutional encoder 224 that may be effective to generate a feature representation of the high resolution image data $I_{hr}$ for classification as real (e.g., image 221) or fake (e.g., image 222). Both $\mathcal{L}_{D_2}$ and $\mathcal{L}_{G_2}$ have an additional auxiliary classification loss component $\mathcal{L}_C$ to improve the performance of the classification. It should be noted that the auxiliary classification may be optional for a particular classification task and may be suited to the particular dataset being used to synthesize image data. In the example of outfit generation, the auxiliary classification label set 220 may span gender, color, and/or product type of the outfit and/or clothing item being synthesized.

$$\mathcal{L}_{D_1} = \mathbb{E}_{(I_r,\hat{q})\sim p_{data}}\left[\sum_{t\in T} \log D_2(I_r, \hat{q}_t)\right] + \mathbb{E}_{I_{lr}\sim PG_1,\hat{q}\sim p_{data}}\left[\sum_{t\in T} \log(1 - D_2)(G_2(I_{lr}, \hat{q}_t), \hat{q}_t))\right] + \lambda_1 \mathcal{L}_C \tag{3}$$

$$\mathcal{L}_{G_2} = \mathbb{E}_{I_{lr}\sim p_{G_1},\hat{q}\sim p_{data}}\left[\sum_{t\in T} \log(1 - D_2(G_2(I_{lr}, \hat{q}_t), \hat{q}_t))\right] - \lambda_2 \mathcal{L}_C \tag{4}$$

$$\mathcal{L}_C = \mathbb{E}_{I_r\sim p_{data}}\left[\sum_{t\in T} \log P(C = c \mid I_r)\right] + \mathbb{E}_{I_{lr}\sim pG_1,\hat{q}\sim p_{data}}\left[\sum_{t\in T} \log P(C = c \mid G_2(I_{lr}, \hat{q}_t))\right] \forall C \tag{5}$$

During training, the discriminator 260 may generate labels indicating a decision as to whether an image is a real image (e.g., image 220) or a fake image (e.g., image 222). The classification may be fed back to generator 250 as a training signal that may be used to update weights and/or biases of the generator 250. Similarly, ground truth data may be provided to discriminator 260 that may be used to update parameters of the discriminator 260 during training.

The stage-I GAN (FIG. 1), including the LSTM 105 or other RNN, is trained end-to-end, but is fixed for training of the stage-II GAN (FIG. 2). Stage-II GAN is trained end-to-end with the fixed stage-I GAN. Accordingly, FC layer 204 (or any DNN) may be used by stage-II GAN to determine a learned projection ($\hat{h}_r$) of the hidden state $h_t$ from the stage-I GAN.

Model Architecture—Stage-II

The encoder-decoder (208/212) network architecture with residual blocks (210) for the Stage-II generator may be retained from StackGAN (Han Zhang, Tao Xu, Hongsheng Li, Shaoting Zhang, Xiaogang Wang, Xiaolei Huang, and Dimitris N Metaxas. Stackgan: Text to photo-realistic image synthesis with stacked generative adversarial networks. In *Proceedings of the IEEE International Conference on Computer Vision,* pages 5907-5915, 2017.). Similar to the stage-I architecture, the projected hidden state 202 $\hat{h}_t$ may be stacked along with color embedding $c_t$ to generate the $N_g$ dimensional conditioning vector $\hat{q}_t$, which may be spatially replicated to form a $M_g \times M_g \times N_g$ tensor. Meanwhile, the Stage-I result $I_{lr}$ generated by the stage-I GAN may be encoded using encoder 208 to generate a data representation of the same number of dimensions as the spatially replicated conditioning of the $M_g \times M_g \times N_g$ tensor. The image features and the conditioning may be concatenated. The stacked image features and conditioning may be processed by one or more residual blocks 210 and a decoder (e.g., decoder 212) to generate a $W_2 \times H_2$ high-resolution image, $I_{hr}$. As previously described residual blocks 210 may be a decoder that may be omitted, depending on the desired implementation.

The discriminator structure may be similar to the stage-II discriminator in StackGAN. However, in various examples, an auxiliary multi-task classifier may be used, as described above. In the fashion example discussed herein, the discriminator 260 may comprise 3 classifier layers for gender, color, and/or product type classification in addition to a real-vs-fake image classifier. A multi-task classifier may be used to provide additional losses for the discriminator 260 that may, in turn, aid in training generator 250. Spectral normalization (Takeru Miyato, Toshiki Kataoka, Masanori Koyama, and Yuichi Yoshida. Spectral normalization for generative adversarial networks. ICLR, 2018) may be used on all layers in the discriminator 260 to regularize the discriminator 260. In various examples, spectral normalization may prevent the generator 250 from collapsing during training.

Color Modeling

In various examples, prior attempts at text-to-image synthesis using GANs (e.g., StackGAN) may input color as a part of text conditioning. However, the embeddings derived from recurrent language models and/or word-embedding spaces like GloVe and Word2Vec often do not respect perceptual similarity in the color space. Often, when providing a color restraint in a text input string, the generated images in prior text-to-image GANs do not respect the color restraint provided by input text conditioning.

To obtain a discriminative representation for color, coarse clusters of perceptually similar colors may be derived (and/or selected) in a color dataset that may be mapped to text descriptions referencing a particular color attribute. In various examples, tagged color attributes for objects (e.g., data representations of objects of interest) in any desired dataset that includes color tags may be used to generate the color clusters. However, if color tags are unavailable they may be manually labeled and/or text data (e.g., from object titles) may be used to identify color clusters. The color tags may be converted to LAB space (a color space defined by the International Commission on Illumination) or some other color space using a color library and may be clustered using K-Means clustering (or any other form of clustering algorithm) to generate coarse clusters with similar colors. If a color tag is absent for a sample, the sample may be assigned to a dummy K+1 cluster. A ResNet-50 convolutional neural network (CNN) classifier, or similar, may be trained in a supervised setting with labels generated from the color clustering. For training the GAN, a softmax output of the color classifier may be used as the conditioning for all training examples. In various examples, the softmax output of the color classifier may mitigate overall noise and may correctly classify examples in a cluster which were incorrectly tagged in the original dataset. Use of clustering for color embedding may be highly scalable as any new color input may be assigned to the nearest cluster without requiring the model to be retrained.

Incorporating color explicitly as a conditioning $c_t$ may improve the consistency of colors produced for a given text conditioning. Additionally, incorporating color explicitly, alleviates the problems with prior technologies (including stackGAN) where color restraints in input text strings are not respected in the output image data. In various examples, during inference, a color cluster (e.g., a cluster of similar colors) may be determined based on text representing a color in text string 101. For example, a lookup of a previously-determined color cluster may be determined based on a text string representing a color. A cluster value of the cluster (e.g., a color value of the cluster) may be used as the color embedding $c_t$ for a particular input.

Figure 3:
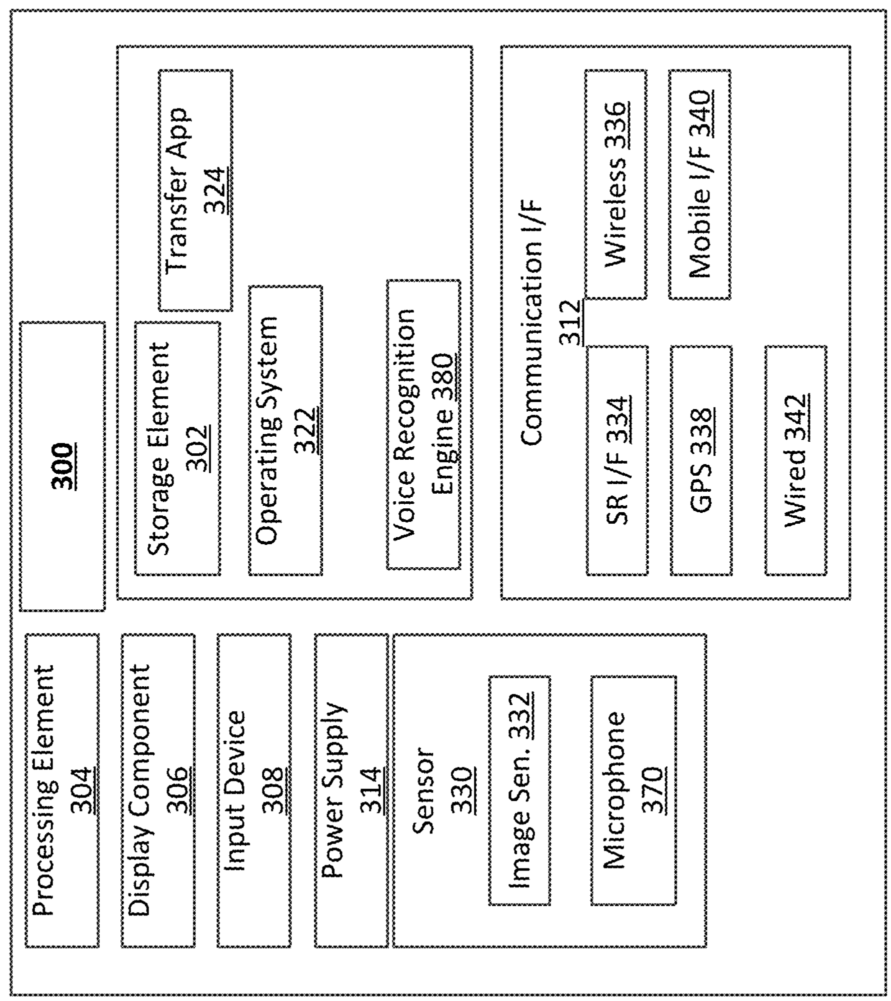
FIG. 3 is a block diagram showing an example architecture of a computing device, in accordance with various aspects of the present disclosure.

FIG. 3 is a block diagram showing an example architecture 300 of a computing device, such as the camera devices, processors, mobile devices, and other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a non-transitory, computer-readable storage element 302. The processing element 304 may comprise at least one processor. Any suitable processor or processors may be used. For example, the processing element 304 may comprise one or more digital signal processors (DSPs) and/or image signal processors (ISPs). In some examples, the processing element 304 may be effective to perform one or more functions of generators 150, 250, and/or discriminators 160, 260, as described above. The storage element 302 can include one or more different types of non-transitory, computer-readable memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to receive images and/or video from another device (e.g., a mobile device, image capture device, and/or display device) or from an image sensor 332 included in the architecture 300. In some examples, the transfer application 324 may also be configured to upload the received images to another device that may perform processing as described herein (e.g., a mobile device and/or another computing device).

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a “wake word” to be received by microphone 370. Upon receipt of the wake word, voice recognition engine 380 may stream audio to a voice recognition server for analysis. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol. In various examples, mobile interface 340 may allow computing device(s) 107 to communicate with one or more other computing devices that may be used to perform various aspects of the techniques described herein.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output. An example of an image sensor 332 may be a camera or other image sensor. In various examples, image sensor 332 may be configured to capture color information, IR image data, image geometry information, and/or ambient light information.

Motion sensors may include any sensors that sense motion of the architecture including, for example, gyro sensors and accelerometers. Motion sensors, in some examples, may be used to determine an orientation, such as a pitch angle and/or a roll angle, of a camera. A gyro sensor may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. In some examples, an accelerometer (not shown in FIG. 3) may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338. As described, in some examples, image sensor 332 may be effective to detect infrared light. In at least some examples, architecture 300 may include an infrared light source to illuminate the surrounding environment.

Figure 4:
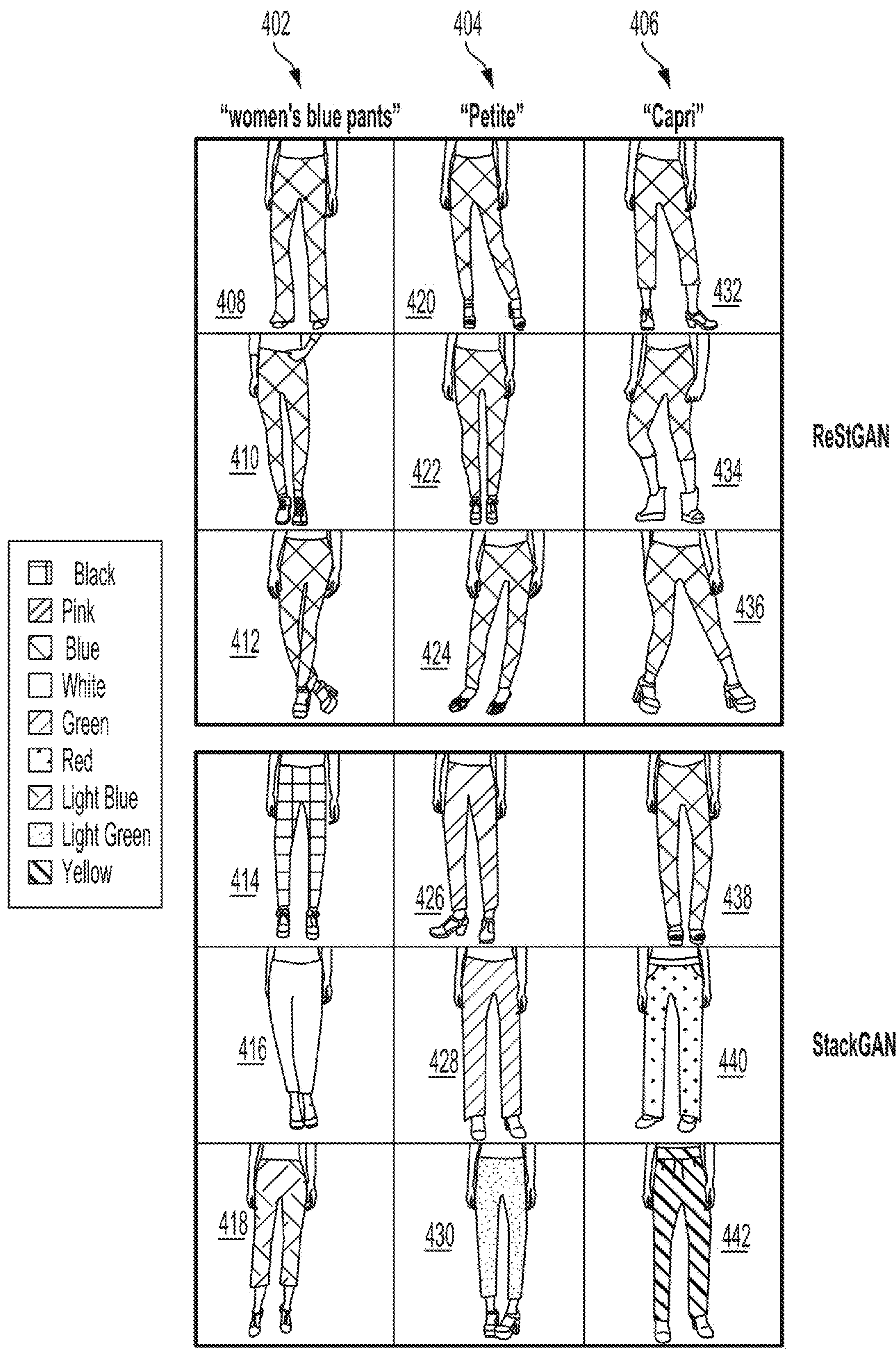
FIG. 4 is a diagram illustrating synthetic image data, generated in accordance with various aspects of the present disclosure.

FIG. 4 is a diagram illustrating synthetic image data, generated in accordance with various aspects of the present disclosure. In FIG. 4, a user may have searched a database (e.g., a fashion database) using an initial search string query 402, and may thereafter modify the text string search query in order to provide search results that are more narrowly tailored to the user's interest. For example, the user may initially input the search query 402—"women's blue pants." FIG. 4 illustrates three synthetic images—408, 410, and 412—that were generated in response to the query 402 using the stage-I and stage-II GANs described above in reference to FIGS. 1-2. Additionally, FIG. 4 illustrates three synthetic images—414, 416, and 418 that were generated using the stackGAN system.

In FIG. 4, color is represented using different shading patterns. As can be seen, incorporating color explicitly as a conditioning $c_t$ has resulted in images 408, 410, and 412 depicting blue pants. Conversely, images 414, 416, and 418, generated using stackGAN do not respect the color restraint in the input text string (e.g., these images do not depict blue pants). In various examples, for a particular search string, different images may be generated based at least in part on the sampled noise vector z. For example, each of images 408, 410, and 412 may be generated for the search string query 402. However, each of images 408, 410, and 412 may be generated using a different noise vector z sampled from a noise distribution. Accordingly, the images may vary with respect to each other providing a variety of different photorealistic images for the user.

In text string 404, the user has modified the input search query by including the term "Petite" in a text string modification. Images 420, 422, and 424, generated using the stage-I and stage-II GANs described above in reference to FIGS. 1-2, depict a variety of slim-fitting blue pants. Due to the separate color conditioning $c_t$ and the hidden state information from the recurrent neural network (e.g., LSTM network 105), images 420, 422, and 424 again depict pants that are blue in color. Additionally, all pants shown are styled for women. Conversely, in images 426, 428, and 430 synthesized using stackGAN the pants depicted are not blue, and, in addition, image 428 depicts pants styled for men, ignoring the constraint specified in the initial search string query 402.

Finally, in text string 406, the user has modified the input search query by including the term "Capri" in a text string modification. Images 432, 434, and 436, generated using the stage-I and stage-II GANs described above in reference to FIGS. 1-2, depict a variety of slim-fitting blue pants that are cut in a capri-pant fashion. Due to the separate color conditioning $c_t$ and the hidden state information from the recurrent neural network (e.g., LSTM network 105), images 432, 434, and 436 again depict pants that are blue in color. Additionally, all pants shown are styled for women. Conversely, in images 438, 440, and 442 synthesized using stackGAN the pants depicted are not blue in images 440 and 442, and, in addition, images 438, 440, and 442 do not depict pants styled in the capri style. Accordingly, the various techniques described herein represent significant improvements over existing technologies.

Figure 5:
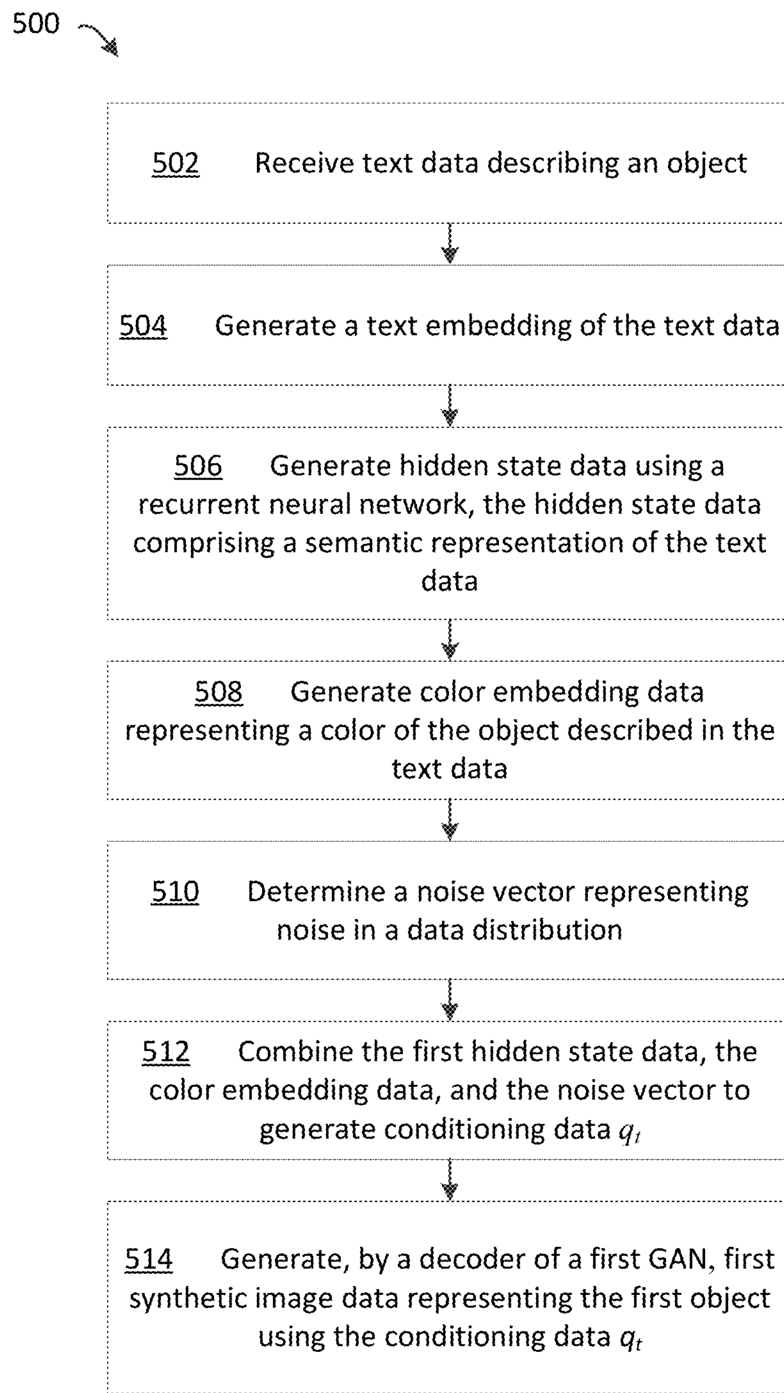
FIG. 5 depicts a process for context aware text-to-image synthesis, in accordance with various aspects of the present disclosure.

FIG. 5 depicts a flow chart showing an example process 500 for context aware text-to-image synthesis. The process 500 of FIG. 5 may be executed by computing device(s) 107 and/or by a combination of computing device(s) 107 and one or more other computing device. The actions of process 500 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 500 may be described above with reference to elements of FIGS. 1-4.

Processing may begin at action 502, "Receive text data describing an object." At action 502, text data may be received by computing device(s) 107. For example, the text data may be received as text data input as a search query. The text data may describe an object of interest, such as an article of clothing. In various examples, the text data may comprise color data indicating one or more colors.

Processing may continue from action 502 to action 504, "Generate a text embedding of the text data." At action 504, a text embedding of the text data may be generated. The text embedding may be a feature representation of the text data for further processing by a recurrent neural network. At action 506, a recurrent neural network (e.g., LSTM network 105) may be used to generate hidden state data comprising a semantic representation of the text data.

Processing may continue from action 506 to action 508, "Generate color embedding data representing a color of the object described in the text data." At action 508, color embedding may be generated. For example, the text description describing color may be mapped to a cluster of similar colors generated using K-means clustering (or some other clustering algorithm). A ResNet-50 CNN classifier, or similar, may be trained to determine the color represented in the text data.

Processing may continue from action 508 to action 510, "Determine a noise vector representing noise in a data distribution associated with the object." At action 510, a noise vector z may be determined. The noise vector z may be sampled from a data distribution of interest (e.g., a normal distribution, a mixture of Gaussian distributions, etc.).

Processing may continue from action 510 to action 512, "Combine the hidden state data, the color embedding data, and the noise vector to generate conditioning data $q_t$." At Action 512, the hidden state data output by the LSTM (or other recurrent neural network), the color embedding data $c_t$, and the noise vector z may be concatenated or otherwise combined to generate conditioning data $q_t$. The conditioning data $q_t$ may comprise semantic information describing the input text data at a time t as well as past history of text data (e.g., within the same search session). In various examples, a session may comprise a time period during which text is entered into a search field or other field, including modifications of the text (e.g., additions, deletions, and/or replacement). In various examples, sessions may end via a timeout or because a user has deleted the entire search query and has replaced the entire query with other text. Additionally, the conditioning data $q_t$ may comprise color embedding data $c_t$ describing color information represented in the text data, and noise z used to inject variability into the synthesized image results.

Processing may continue from action 512 to action 514, "Generate, by a decoder of a first GAN, first synthetic image data representing the first object using the conditioning data $q_t$." At action 514, a decoder trained as part of a first GAN network (e.g., a part of generator 150) may be used to generate first synthetic image data representing the object described in the text data (including past history of text modifications). In various examples, the first synthetic image data generated using the first GAN network may lack fine details and accordingly may be described as low resolution image data. As such, in various examples, processing may continue from action 514 of FIG. 5 to action 602 of FIG. 6.

Figure 6:
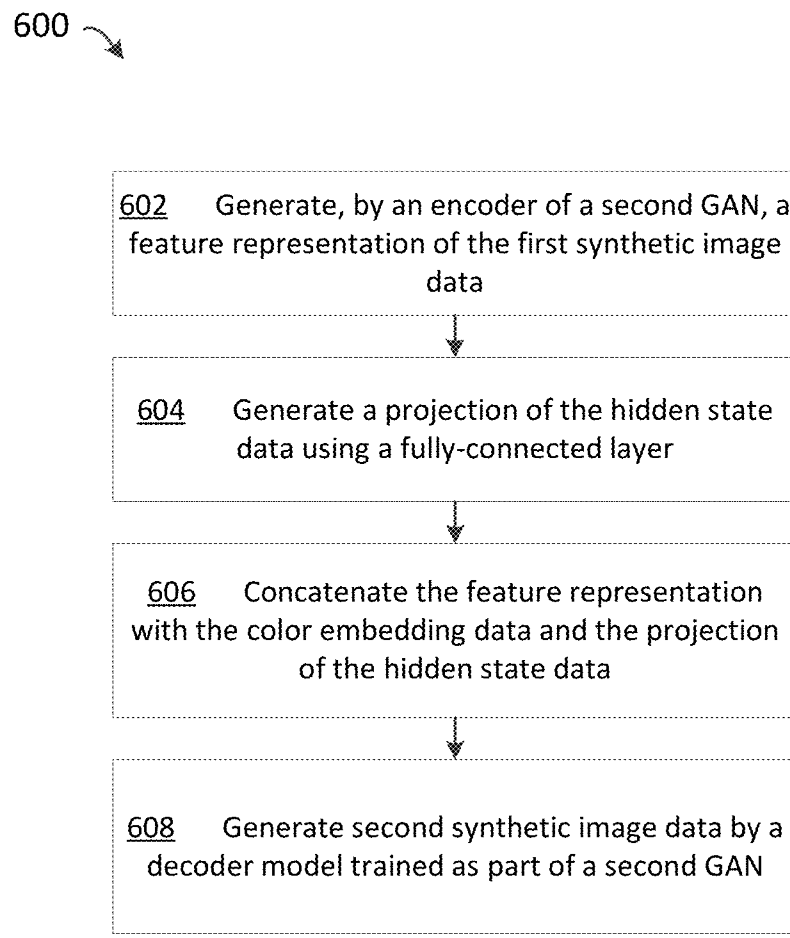
FIG. 6 depicts another example process for context aware text-to-image synthesis, in accordance with various aspects of the present disclosure.

FIG. 6 depicts a flow chart showing an example process 600 for context aware text-to-image synthesis. The process 600 of FIG. 6 may be executed by computing device(s) 107 and/or by a combination of computing device(s) 107 and one or more other computing device. The actions of process 600 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 600 may be described above with reference to elements of FIGS. 1-5.

Processing may begin at action 602, "Generate, by an encoder of a second GAN, a feature representation of the first synthetic image data." At action 602, an encoder trained as part of a second GAN (e.g., generator 250 and discriminator 260) may generate a feature representation of first synthetic image data. For example, encoder 208 of generator 250 may perform one or more convolution operations on low resolution image data generated by generator 150 to generate a feature representation of the low resolution image data.

Processing may continue from action 602 to action 604, "Generate a projection of the hidden state data using a fully-connected layer." At action 604, a fully-connected layer may receive the hidden state data $h_t$ and may generate a projection of the hidden state data $h_t$ in a desired feature space (e.g., in a desired number of dimensions).

Processing may continue from action 604 to action 606, "Concatenate the feature representation with the color embedding data and the projection of the hidden state data." At action 606, the feature representation may be concatenated with the color embedding data $c_t$ and the projection of the hidden state data generated at action 604. The concatenated conditioning data may be processed at action 608. At action 608, high resolution image data may be generated by a decoder model (e.g., residual blocks 210 and/or decoder 212). Decoder 212 and/or residual blocks 210 may perform one or more deconvolution operations in order to generate the high resolution image data. Decoder 212, residual blocks 210, encoder 208, and/or fully-connected layer 204 may be trained as a part of the Stage-II GAN comprising generator 250 and discriminator 260.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

Figure 7:
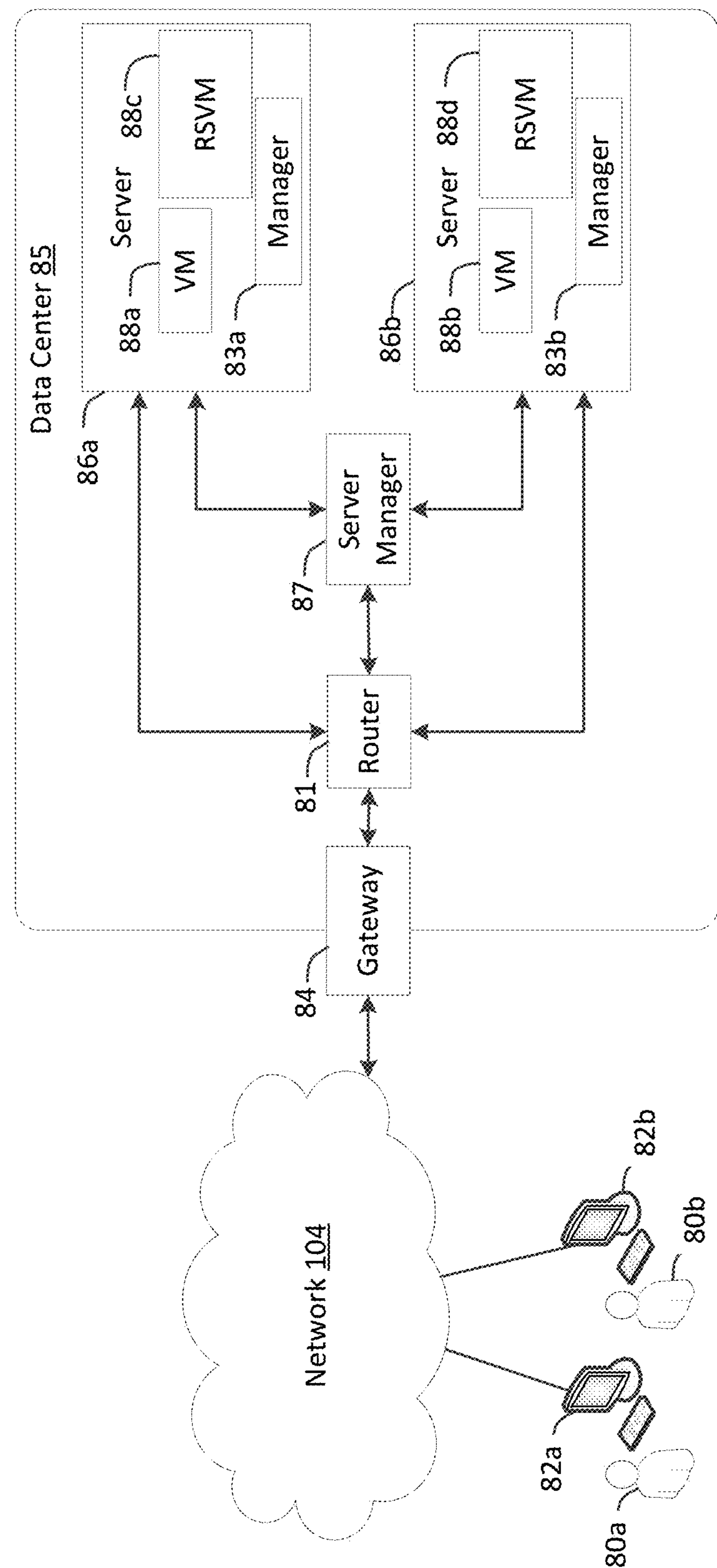
FIG. 7 is a diagram illustrating an example system for sending and providing data that may be used in accordance with the present disclosure.

An example system for sending and providing data and context aware text-to-image synthesis will now be described in detail. In particular, FIG. 7 illustrates an example computing environment in which the embodiments described herein may be implemented. FIG. 7 is a diagram schematically illustrating an example of a data center 85 that can provide computing resources to users 80*a* and 80*b* (which may be referred herein singularly as user 80 or in the plural as users 80) via user computers 82*a* and 82*b* (which may be referred herein singularly as user computer 82 or in the plural as user computers 82) via network 104. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 86*a* and 86*b* (which may be referred herein singularly as server 86 or in the plural as servers 86) that provide computing resources. These resources may be available as bare metal resources or as virtual machine instances 88*a-d* (which may be referred herein singularly as virtual machine instance 88 or in the plural as virtual machine instances 88). In at least some examples, server manager 87 may control operation of and/or maintain servers 86. Virtual machine instances 88*c* and 88*d* are rendition switching virtual machine ("RSVM") instances. The RSVM virtual machine instances 88*c* and 88*d* may be configured to perform all, or any portion, of the techniques for improved rendition switching and/or any other of the disclosed techniques in accordance with the present disclosure and described in detail above. As should be appreciated, while the particular example illustrated in FIG. 7 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 82. User computers 82 may be computers utilized by users 80 or other customers of data center 85. For instance, user computer 82*a* or 82*b* may be a server, a desktop or laptop personal computer, a tablet computer, a wireless telephone, a personal digital assistant (PDA), an e-book reader, a game console, a set-top box or any other computing device capable of accessing data center 85. User computer 82*a* or 82*b* may connect directly to the Internet (e.g., via a cable modem or a Digital Subscriber Line (DSL)). Although only two user computers 82*a* and 82*b* are depicted, it should be appreciated that there may be multiple user computers.

User computers 82 may also be utilized to configure aspects of the computing resources provided by data center 85. In this regard, data center 85 might provide a gateway or web interface through which aspects of its operation may be configured through the use of a web browser application program executing on user computer 82. Alternately, a stand-alone application program executing on user computer 82 might access an application programming interface (API) exposed by data center 85 for performing the configuration operations. Other mechanisms for configuring the operation of various web services available at data center 85 might also be utilized.

Servers 86 shown in FIG. 7 may be servers configured appropriately for providing the computing resources described above and may provide computing resources for executing one or more web services and/or applications. In one embodiment, the computing resources may be virtual machine instances 88. In the example of virtual machine instances, each of the servers 86 may be configured to execute an instance manager 83*a* or 83*b* (which may be referred herein singularly as instance manager 83 or in the plural as instance managers 83) capable of executing the virtual machine instances 88. The instance managers 83 may be a virtual machine monitor (VMM) or another type of program configured to enable the execution of virtual machine instances 88 on server 86, for example. As discussed above, each of the virtual machine instances 88 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 81 may be utilized to interconnect the servers 86*a* and 86*b*. Router 81 may also be connected to gateway 84, which is connected to network 104. Router 81 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a data center 85 is also employed to at least in part direct various communications to, from and/or between servers 86*a* and 86*b*. While FIG. 7 depicts router 81 positioned between gateway 84 and data center 85, this is merely an exemplary configuration. In some cases, for example, data center 85 may be positioned between gateway 84 and router 81. Data center 85 may, in some cases, examine portions of incoming communications from user computers 82 to determine one or more appropriate servers 86 to receive and/or process the incoming communications. Data center 85 may determine appropriate servers to receive and/or process the incoming communications based on factors such as an identity, location or other attributes associated with user computers 82, a nature of a task with which the communications are associated, a priority of a task with which the communications are associated, a duration of a task with which the communications are associated, a size and/or estimated resource usage of a task with which the communications are associated and many other factors. Data center 85 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory, computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above- described example(s) without departing substantially from the spirit and principles of the disclosure. All such modifications and variations are intended to be included herein within the scope of this disclosure and protected by the following claims.

What is claimed is:

1. A computer-implemented method of generating synthetic image data, comprising:

receiving first text data describing a first object, wherein the first text data includes a description of a color of the first object;

generating a text embedding of the first text data;

sending the text embedding to an input layer of a long short term memory (LSTM) network;

generating, by the LSTM network, first hidden state data comprising a semantic representation of the first text data;

generating color embedding data representing the color of the first object;

determining a noise vector by sampling a normal distribution of noise values;

combining the first hidden state data, the color embedding data, and the noise vector to generate conditioning data;

sending the conditioning data to an input layer of a first decoder model, wherein the first decoder model is trained as part of a first generative adversarial network (GAN) including the LSTM network; and generating, by the first decoder model using the conditioning data, first synthetic image data representing the first object, wherein the first synthetic image data comprises a first image quality.

2. The computer-implemented method of claim 1, further comprising:

sending the first synthetic image data to an encoder model;

generating by the encoder model a feature representation of the first synthetic image data;

generating a projection of the first hidden state data using a fully-connected layer;

concatenating the feature representation of the first synthetic image data with the color embedding data and the projection of the first hidden state data; and generating second synthetic image data representing the first object by a second decoder model, wherein the second decoder model is trained as part of a second GAN, wherein the second synthetic image data comprises a second image quality that is improved relative to the first image quality.

3. The computer-implemented method of claim 1, further comprising:

determining a cluster of similar colors included in a color dataset;

determining that the description of the color of the first object in the first text data corresponds to the cluster of similar colors; and selecting a cluster value from the cluster of similar colors as the color embedding data.

4. A computer-implemented method, comprising;

receiving first text data comprising a description of an object;

determining, by a recurrent neural network, first semantic representation data representing the first text data;

generating, using the first semantic representation data, by a generator of a first generative adversarial network (GAN), first image data representing the object, wherein the recurrent neural network and the first GAN are trained together;

generating, by an encoder of a second GAN, a first feature representation of the first image data;

combining the first feature representation with a projection of the first semantic representation data; and generating, by a decoder of the second GAN, second image data representing the first text data.

5. The method of claim 4, further comprising:

receiving second text data comprising a modification of the first text data;

determining, by the recurrent neural network, second semantic representation data representing at least a portion of the first text data and the second text data; and generating, using the second semantic representation data by the generator, third image data representing the object.

6. The method of claim 4, further comprising:

determining a noise vector associated with a data distribution; and combining the first semantic representation data with the noise vector, wherein the noise vector is effective to introduce variability into the first image data generated by the first GAN and the second GAN.

7. The method of claim 4, further comprising:

determining color embedding data associated with a color indicated by the first text data;

generating conditioning data by combining the first semantic representation data with the color embedding data; and sending the conditioning data to an input layer of the generator of the first GAN, wherein the color embedding data is used by the generator to select at least one color of the first image data.

8. The method of claim 7, further comprising combining, by the second GAN, the color embedding data with the first feature representation and the projection of the first semantic representation data, wherein the decoder of the second GAN generates the second image data based at least in part on the color embedding data.

9. The method of claim 4, further comprising:

generating a first sentence embedding of the first text data at a first time;

sending the first sentence embedding of the first text data to a long short term memory (LSTM) network of the recurrent neural network;

generating, by the LSTM network, first hidden state data representing the first sentence embedding;

generating a second sentence embedding of second text data at a second time, wherein the second text data represents a modification of the first text data;

sending the second sentence embedding of the second text data to the LSTM network; and generating, by the LSTM network, second hidden state data representing the second sentence embedding and the first sentence embedding, wherein the first semantic representation data comprises the second hidden state data.

10. The method of claim 4, further comprising:

determining color embedding data associated with a color indicated by the first text data; and combining, by the second GAN, the color embedding data with the first feature representation and the projection of the first semantic representation data, wherein the generating, by the decoder of the second GAN, the second image data is based at least in part on the color embedding data.

11. The method of claim 4, further comprising:

generating, by the encoder of the second GAN, the first feature representation in a first number of dimensions;

combining the first semantic representation data with first color embedding data to generate conditioning data, wherein the conditioning data comprises the first number of dimensions; and concatenating the conditioning data and the first feature representation.

12. The method of claim 4, further comprising:

generating, by a discriminator of the first GAN, a first label indicating that the first image data is synthetic;

sending a signal to the generator of the first GAN indicating the first label associated with the first image data; and updating at least one parameter of the generator of the first GAN based at least in part on the signal.

13. A system comprising:

at least one processor; and at least one non-transitory, computer-readable memory storing instructions that, when executed by the at least one processor, are effective to program the at least one processor to:

receive first text data comprising a description of an object;

determine, by a recurrent neural network, first semantic representation data representing the first text data;

generate, using the first semantic representation data by a generator of a first generative adversarial network (GAN), first image data representing the object, wherein the recurrent neural network and the first GAN are trained together;

generate, by an encoder of a second GAN, a first feature representation of the first image data;

combine the first feature representation with a projection of the first semantic representation data; and generate, by a decoder of the second GAN, second image data representing the first text data.

14. The system of claim 13, the at least one non-transitory, computer-readable memory storing further instructions that, when executed by the at least one processor, are effective to further program the at least one processor to:

receive second text data comprising a modification of the first text data;

determine, by the recurrent neural network, second semantic representation data representing at least a portion of the first text data and the second text data; and generate, using the second semantic representation data by the generator, third image data representing the object.

15. The system of claim 13, the at least one non-transitory, computer-readable memory storing further instructions that, when executed by the at least one processor, are effective to further program the at least one processor to:

determine a noise vector associated with a data distribution; and combine the first semantic representation data with the noise vector, wherein the noise vector is effective to introduce variability into the first image data generated by the first GAN and the second GAN.

16. The system of claim 13, the at least one non-transitory, computer-readable memory storing further instructions that, when executed by the at least one processor, are effective to further program the at least one processor to:

determine color embedding data associated with a color indicated by the first text data;

generate conditioning data by combining the first semantic representation data with the color embedding data; and send the conditioning data to an input layer of the generator of the first GAN, wherein the color embedding data is used by the generator to select at least one color of the first image data.

17. The system of claim 16, the at least one non-transitory, computer-readable memory storing further instructions that, when executed by the at least one processor, are effective to further program the at least one processor to combine, by the second GAN, the color embedding data with the first feature representation and the projection of the first semantic representation data, wherein the decoder of the second GAN generates the second image data based at least in part on the color embedding data.

18. The system of claim 13, the at least one non-transitory, computer-readable memory storing further instructions that, when executed by the at least one processor, are effective to further program the at least one processor to:

generate a first sentence embedding of the first text data at a first time;

send the first sentence embedding of the first text data to a long short term memory (LSTM) network of the recurrent neural network;

generate, by the LSTM network, first hidden state data representing the first sentence embedding;

generate a second sentence embedding of second text data at a second time, wherein the second text data represents a modification of the first text data;

send the second sentence embedding of the second text data to the LSTM network; and generate, by the LSTM network, second hidden state data representing the second sentence embedding and the first sentence embedding, wherein the first semantic representation data comprises the second hidden state data.

19. The system of claim 13, the at least one non-transitory, computer-readable memory storing further instructions that, when executed by the at least one processor, are effective to further program the at least one processor to:

determine color embedding data associated with a color indicated by the first text data;

and combine, by the second GAN, the color embedding data with the first feature representation and the projection of the first semantic representation data, wherein the generating, by the decoder of the second GAN, the second image data is based at least in part on the color embedding data.

20. The system of claim 13, the at least one non-transitory, computer-readable memory storing further instructions that, when executed by the at least one processor, are effective to further program the at least one processor to:

generate, by the encoder of the second GAN, the first feature representation in a first number of dimensions;

combine the first semantic representation data with first color embedding data to generate condition data, wherein the conditioning data comprises the first number of dimensions; and concatenate the conditioning data and the first feature representation.

* * * * *